March 21, 1967     D. R. GRAFHAM     3,310,724
BATTERY CHARGING REGULATORS
Filed April 27, 1964     2 Sheets-Sheet 1

INVENTOR
DENIS R. GRAFHAM,
BY
HIS ATTORNEY.

March 21, 1967  D. R. GRAFHAM  3,310,724
BATTERY CHARGING REGULATORS
Filed April 27, 1964  2 Sheets-Sheet 2

INVENTOR:
DENIS R. GRAFHAM,

BY *Urban H. Faubion*
HIS ATTORNEY.

United States Patent Office 3,310,724
Patented Mar. 21, 1967

3,310,724
BATTERY CHARGING REGULATORS
Denis R. Grafham, Auburn, N.Y., assignor to General
Electric Company, a corporation of New York
Filed Apr. 27, 1964, Ser. No. 362,889
7 Claims. (Cl. 320—39)

This invention relates to voltage sensitive circuits for monitoring the voltage level or magnitude of a voltage source and particularly such circuits for use as battery charging regulators. It is particularly contemplated that the characteristics of solid state switches will be employed in the circuits.

Because of the many problems involved, design of a battery charging regulator is necessarily a complex process. When too high a charging rate is used, it may lead to "gassing" electrolyte evaporation, thermal runaway, and premature battery failure. Too low a rate of charging may slow down or completely prevent acceptance of charge by the battery—especially at low temperature. Clearly, selection and maintenance of the proper charge rate are prime considerations for acceptable performance and long battery life. Several factors complicate this process. For example, (1) The impedance of the battery fluctuates widely with electrolyte temperature, specific gravity, age of battery, and applied charge current, (2) Optimum charge rate itself is not constant, being influenced by the factors listed above.

Practical solutions to the problems have resulted in three basic approaches each of which represents a different compromise between the various performance factors and cost.

One approach involves constant current charging. By this approach variation of charge rate due to fluctuating battery parameters are effectively swamped out by making the charge source impedance high compared with nominal battery impedance. If the selected charge rate is made sufficiently high for rapid charging, a means must be added to limit charging time. Otherwise, battery overcharging and electrolyte evaporation may occur on completion of a normal charge cycle. This method is effective in reducing charging current variations due to line voltage variations.

Another method is called the constant voltage method. As the name implies, the method involves applying a constant voltage until the battery is fully charged. A principal advantage of this method is that there is little danger of overcharge so long as the source voltage never exceeds the nominal fully charged battery voltage. However, this method entails excessively high starting currents, as there is very little series impedance to absorb the difference between the source voltage and the (low) discharged battery voltage, charging current falls off rapidly as the battery voltage rises under charge and the charge rate is slow and is badly affected by line voltage variations unless special circuit means are provided for compensating.

A third approach is known as the multiple rate constant voltage battery charging method. This method is similar to the constant voltage method described above but the source voltage is switched in steps as the battery charge cycle progresses. This method allows a lower starting rate and a higher finishing rate than the constant voltage method and as many steps may be used as is desirable. The problem is when and how to accomplish the switching since the state of battery charge must be sensed and, in general, rather complex switching monitoring and sensing circuitry is involved. Further, line voltage variations may be bothersome.

The present circuits avoid the difficulties inherent in each of the approaches discussed above and display a charging characteristic somewhere between the constant voltage and constant current modes of operation. The circuits take advantage of the rectifying characteristics of the solid state switches so that alternating power is directly converted into the direct current necessary for the charging process. Also because the solid state switches contemplated are such efficient static power switches, they can perform with ease any of the in-cycle switching functions required (such as those described in connection with the above approaches). Further, the inherent high power gain between input and output of such switches permits low power, low cost control circuitry to be employed.

As battery charging voltage regulators, the circuits provide for removing charging current when the battery voltage rises to full charge and automatically applying charging current when the battery falls below full charge level. As will be discussed later, special circuitry is arranged in the case of battery charger regulators for use with battery types which do not exhibit a well defined rising voltage characteristic on completion of normal charge in order to prevent rapid cyclic application of charging current.

These characteristics may readily be translated for general application in voltage-regulator circuitry. For example, when any CEMF (e.g. voltage of battery being charged) rises to a predetermined level, applied charging current is removed. When the voltage being monitored again drops below a predetermined level (low battery voltage) charging current is again applied.

In carrying out the present invention, the terminals of the voltage source to be monitored are connected in series with the main current path of a solid state supply switch across the terminals of a main voltage supply in order to provide that voltage will be applied from the main voltage supply across terminals of the monitored voltage source when the supply switch is conductive. A second solid state switch (monitoring switch) is interconnected with the gate terminal of the supply switch in such a manner that the supply switch is conductive when the monitoring switch is non-conductive, and non-conductive when the monitor switch is conductive earlier in a given cycle than would be the supply switch. The gate terminal of the monitoring switch is interconnected with the terminals of the monitored voltage source by a voltage comparator in such a manner that the monitoring switch is effectively non-conductive when the monitored voltage is below the preselected value (hence, the supply switch is conductive) and conductive when the monitored voltage reaches the preselected value (hence the supply switch is rendered non-conductive).

The novel features which are believed to be characteristic of the invention are set forth with particularity in the appended claims. The invention itself, however, both as to its organization and method of operation together with further objects and advantages thereof may best be understood by reference to the following description taken in connection with the accompanying drawings in which FIGURE 1 depicts in schematic form a voltage monitoring circuit of the present invention employing one-half wave of the applied voltage source;

Figure 1:
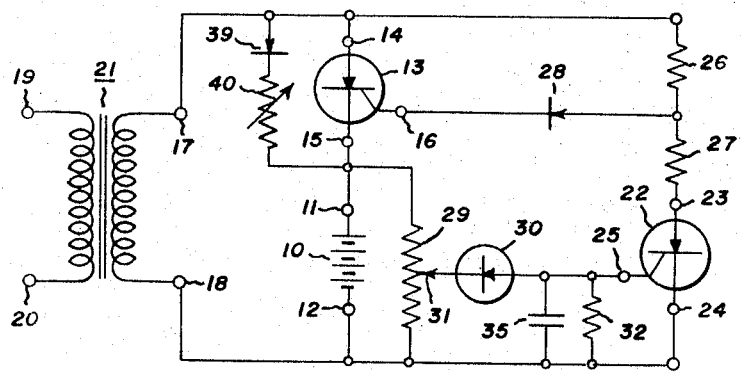

Referring specifically to FIGURE 1, there is shown schematically a circuit employing the principles of the present invention utilized as a battery charging regulator. The source to be regulated or monitored in this instance is battery 10 connected between monitoring terminals 11 and 12. The monitoring terminals 11 and 12 (and hence battery 10) are connected in a series circuit which includes a charging solid state switch 13 which, as illustrated, is an SCR. The charging SCR 13 is provided with anode, cathode and gate terminals 14, 15 and 16 respectively. The series circuit in which the battery 10 is connected includes the main current path (including anode and cathode terminals 14 and 15) of SCR 13. This series circuit is connected directly across the circuit input terminals 17 and 18 so that the main voltage source is applied directly across the series combination of SCR 13 and battery 10.

Input terminals 17 and 18 are supplied from terminals 19 and 20 of an alternating current source through a voltage transformer 21. The voltage transformer 21 is selected to apply the proper voltage between input terminals 17 and 18 and also to provide high series impedance which in battery charging applications serve to flatten out the charge current/time curve and to reduce current variations due to line voltage fluctuations. Since an SCR only passes current (under normal conditions) in one direction, i.e., from its anode terminal 14 to its cathode terminal 15, and since the voltage applied at the input terminals 17 and 18 is an alternating voltage, only one-half cycle (referred to here as the positive half cycle) of the voltage source is utilized for supplying the monitored terminals 11 and 12.

In order to provide for monitoring of the voltage between monitoring terminals 11 and 12, a monitoring solid state three terminal switch 22 is provided. As illustrated, the monitoring switch 22 is also an SCR having anode, cathode and gate terminals (numbered 23, 24 and 25 respectively). The monitoring SCR 22 is connected in series with a pair of resistors 26 and 27 directly across input terminals 17 and 18 and hence is in parallel with the series circuit of charging SCR 13 and battery 10. The polarity of the monitoring SCR is such that, when conducting, it will conduct the same half cycle as the charging SCR and also block the reverse half cycle.

An SCR will not conduct unless the gate terminal is at the proper potential relative to its cathode terminal. Hence, in order to provide a means for rendering the charging SCR 13 conductive, its gate terminal 16 is connected to the series circuit which includes the monitoring SCR 22 at a point between resistors 26 and 27. This connection includes a blocking rectifier 28 which is connected to pass current flow toward gate terminal 16 and block current in the opposite direction, and thus, prevents reverse gate current. This gate connection provides a direct current path from input terminal 17 (and anode terminal 14 of charging SCR 13) through resistor 26, and rectifier 28 to gate terminal 16 and places gate terminal 16 at a proper potential to cause firing of SCR 13 (conduction) when the sense of the voltage at anode terminal 14 is proper and when monitoring SCR 22 is non-conductive.

When monitoring SCR 22 is conductive, resistors 26 and 27 effectively constitute a voltage divider essentially directly across input terminals 17 and 18 which set the voltage at gate terminal 16. The resistors 26 and 27 are apportioned in such a manner that gate terminal 16 is effectively reverse biased when monitoring SCR 22 is conductive. Hence, for this condition, charging SCR 13 cannot be fired if monitoring SCR 22 is fired first. This is the mechanism by which charging current is controlled in the series circuit of charging SCR 13 and monitoring terminals 11 and 12. The charging action is described in more detail in connection with the wave forms of FIGURES 3 through 6 inclusive, however, at this point, the action by which monitoring SCR 22 is rendered conductive or non-conductive and thus determines the condition (conductive or non-conductive) of charging SCR 13 is considered first.

The condition (conducting or non-conducting) of monitoring SCR 22 is determined by interconnecting the gate and cathode terminals 25 and 24 respectively with monitoring terminals 11 and 12 by means of a voltage comparator circuit. As illustrated, the voltage comparator circuit includes a potentiometer 29 connected directly across monitoring terminals 11 and 12 and a voltage reference, the zener diode 30 which is connected directly between a movable tap 31 on rheostate 29 and gate terminal 25 of monitoring SCR 22. An RC smoothing filter (comprising resistance element 32 and capacitor 33) is connected between the cathode and gate terminals 24 and 25 respectively of monitoring SCR 22. Thus, the "compared" voltage is selected on rheostat 29 by rheostat arm 31 and the reference voltage is the breakdown voltage of zener diode 30. The voltage comparator circuit handles only a reference current and therefore does not carry any of the load current from the main voltage source.

In order to fire the monitoring SCR 22 when the monitored voltage between monitoring terminals 11 and 12 reaches the desired level, the arm 31 of the rheostat is moved to the point where it selects a predetermined comparison voltage which is just equal to the breakdown voltage (reference voltage) of the zener diode 30 plus the gate firing voltage of SCR 22 when the total voltage across the rheostat (voltage between monitoring terminals 11 and 12) is the proper or selected value. When the voltage selected by rheostat arm 31 is less than the breakdown voltage for zener diode 30 plus the gate firing voltage of monitoring SCR 22, the monitored voltage is less than the preselected value and monitoring SCR 22 remains non-conductive. Thus, the charging SCR 13 conducts to charge the battery 10. However, when the voltage selected by rheostat arm 31 exceeds the zener diode breakdown voltage plus the gate firing voltage for monitoring SCR 22, the monitoring SCR 22 fires. If monitoring SCR 22 fires earlier in the positive half cycle than charging SCR 13, then the charging SCR 13 cannot become conductive because its gate terminal 16 will not have the proper potential. This action will be described more fully later using the waveforms of FIGURES 3 through 6 inclusive.

A separate trickle charge circuit which constitutes rectifier 39 and the variable resistor 40 is connected around the charging SCR 13 in such a manner as to pass current to the battery 10 on positive half cycles of supply voltage. The circuit may be traced from input terminal 17 through rectifier 39, variable resistor 40, monitoring terminal 11, battery 10 and monitoring terminal 12 back to the opposite input terminal 18. This trickle charge circuit is designed to give a steady low charge so that the battery will not have to be recharged with heavy charging current too frequently.

A full wave charger or regulator allows for faster charging than is possible with the half wave version just described and, of course, allows better utilization of an alternating current voltage source. Adaption of the circuit just described for full wave operation requires nothing more than application of a full wave rectified voltage between input terminals 17 and 18. This may be accomplished by inserting a full wave rectifier between the alternating current terminals 19 and 20 and the input terminals 17 and 18.

Figure 2:
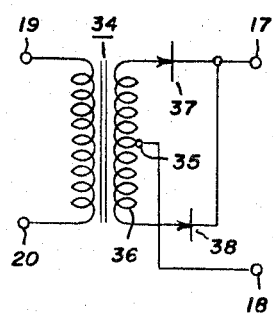
FIGURE 2 illustrates in schematic form a rectifying arrangement which may be employed with all of the half wave circuits described in order to convert them to full wave circuits.

A simple full wave rectifier for use with the circuits illustrated here is illustrated in FIGURE 2. The terminals which are to be connected to the alternating current source and the circuit input terminals are given the same reference numerals as in the circuit of FIGURE 1. In this instance, a transformer 22 having a center tap 23 on the secondary winding 24 is provided. The center tap terminal is connected directly to input terminal 18. Opposite ends of the secondary winding 24 are connected to the other input terminal 17 through rectifiers 37 and 38. These rectifiers are connected to pass current toward input terminal 17 and block current flow in the opposite direction. Thus, a rectified alternating current voltage appears between input terminals 17 and 18 with both half cycles flowing in at input terminal 17 and out at input terminal 18. Thus, both half cycles are of a polarity (positive polarity) to be conducted by both the charging SCR 13 and the monitoring SCR 22.

Figure 3:
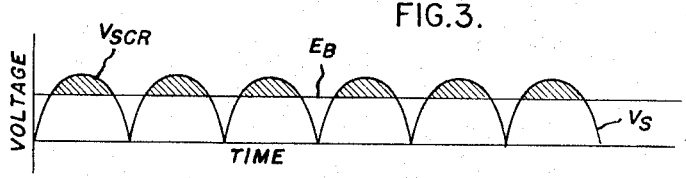
FIGURE 3 illustrates voltage waveforms utilized in describing the present invention with time plotted along the axis of abscissae and voltage plotted along the axis of ordinates.
Figure 4:
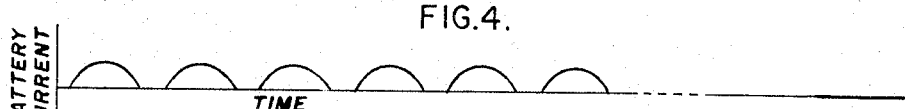
FIGURE 4 represents a plot of battery charging current against time, again time plotted along the axis of abscissae and current plotted along the axis of ordinates.

A better understanding of the operation of the circuit of FIGURE 1 may be obtained by an inspection of the waveforms of FIGURES 3 through 6. Assume first that a full wave rectified unidirectional voltage is applied between input terminals 17 and 18. This voltage is represented by the waveforms $V_S$ in FIGURE 3. The voltage waveform is considered a pulsating voltage since it rises and falls (in this case periodically). The straight line marked $E_B$ in FIGURE 3 represents the level of the monitored battery voltage. The difference between the battery voltage level $E_B$ and the top of the applied voltage waveforms (designated by the shaded area) of $V_S$ is effectively the anode-cathode voltage $V_{SCR}$ of the unfired charging SCR 13.

Figure 5:
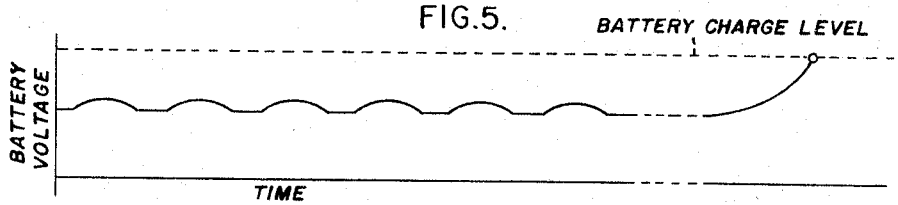
FIGURE 5 is a graph of battery voltage plotted along the axis of ordinates against time plotted along the axis of abscissa.

The battery voltage $E_B$ appears across the full rheostat 29 and a portion is tapped off by the adjustable arm 31. The fraction of the battery voltage tapped off of rheostat 29 is compared against the breakdown voltage of the zener diode 30. With the battery voltage low (battery discharged) the tapped voltage is less than the zener breakdown voltage plus the gate firing voltage for the monitoring SCR. Under these circumstances, the monitoring SCR 22 receives no gate signal. Under these circumstances the monitoring SCR has no applied gate voltage and cannot fire. The potential at gate terminal 16 of the charging SCR 13 is such that it is rendered conductive (triggered) every half cycle by way of the circuit including resistor 26 and rectifier 28. However, the potential between charging SCR 13, anode 14 and cathode 15 is not proper for firing until the input voltage $V_S$ becomes greater than the opposing battery voltage $E_B$. Hence, the battery current has the waveform shown in FIGURE 4, and looks very much like the upper portions (shaded portions) of the supply voltage $V_S$. As the current is applied to the battery in the series circuit of the charging SCR 13, the otherwise level battery voltage rises and falls with charging current as illustrated in FIGURE 5. The reason battery voltage rises as charging current flows is that the battery has internal impedance.

Figure 6:
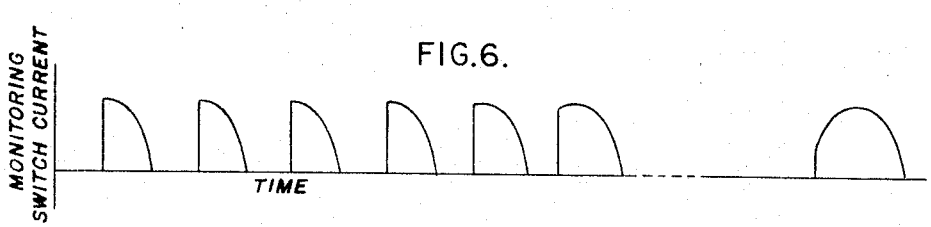
FIGURE 6 is a plot of monitoring switch current plotted along the axis of ordinates against time plotted along the axis of abscissa.

As the battery charges up with each half cycle, its terminal voltage rises steadily until the battery voltage approaches full charge level. Under these conditions, the upper limit of the super-imposed voltage pulses shown on the battery voltage curve of FIGURE 5 may be high enough to cause the monitoring SCR 22 to fire on each half cycle. At first, the charging SCR 22 fires $\pi/2$ radians after the start of each positive half cycle of the supply voltage $V_S$, i.e., coincident with the peak supply voltage, peak charging current and maximum battery voltage. This condition is illustrated by the first four pulses of monitoring switch current as illustrated in FIGURE 6. As the battery terminal voltage goes higher, the firing angle of the monitoring SCR 22 advances each half cycle. However, until the monitoring SCR 22 fires before the input wave $V_S$ has risen far enough to trigger charging SCR 13, the charging SCR 13 is not affected by firing of the monitoring SCR 22. With the monitoring SCR 22 conductive first (in time) in a cycle as illustrated by the last pulse for the monitoring switch current of FIGURE 6, the voltage divider action of resistors 26 and 27 in the series circuit of monitoring SCR 22 keeps blocking diode 28 in the gate circuit of charging SCR 13 back-biased and the charging SCR 13 stays off. Thus, no charging current is applied through the charging SCR 13 to the battery. Charging will recommence automatically when the battery voltage again drops below the level selected on the potentiometer 29. Thus the charging current through the charging SCR 13 is selectively controlled in either an "on" or "off" condition by the battery voltage level for a fixed potentiometer tap position.

Actually some artistic license has been taken in the representations of the waveforms, particularly in FIGURES 5 and 6. The dotted line portions indicate a time lapse. This was felt desirable because, in general, it would require many half cycles of charging current to bring the battery voltage up to charge level. The monitoring SCR firing point does not advance ahead of the $\pi/2$ radian point shown for the first four pulses of FIGURE 6 until the battery voltage is much closer to the charge level than would be indicated by the advanced (earlier) firing points shown for the fourth and fifth pulses. However, it is believed that showing the advanced firing in this way makes the description easier to understand. The last pulse of FIGURE 6 shows that once the battery 10 is fully charged to the current of monitoring SCR 22 flows for almost a full half cycle of supply voltage. This occurs beyond the charge turnoff point indicated in FIGURE 5 where the battery voltage climbs and crosses the dotted line marked "battery charge level." At the corresponding point in FIGURE 4 a heavy straight line along the axis of abscissae indicates that the charging battery current does not flow for the half cycle after the battery voltage reaches charging level.

Figure 7:
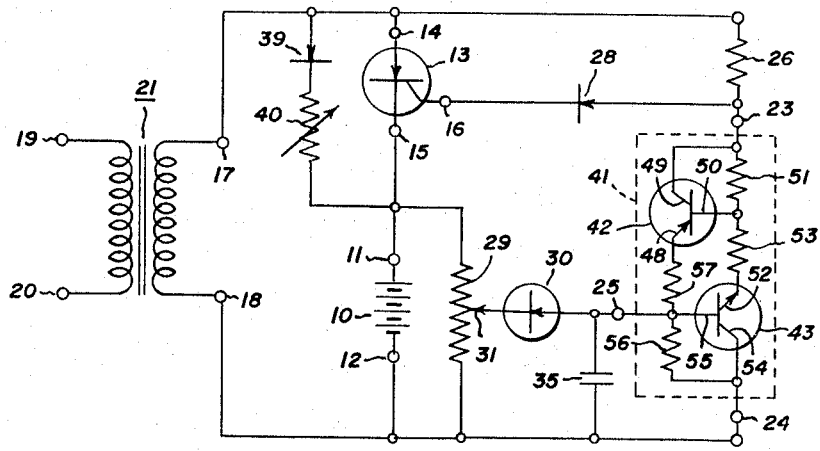
FIGURES 7 and 8 show schematically other embodiments of voltage monitoring and regulating circuits.

The circuit of FIGURE 7 is substantially the same as the circuit of FIGURE 1 and operates in substantially the same manner. For this reason, corresponding circuit elements of the two circuits are given identical reference numerals. The circuit of FIGURE 7 differs from the circuit of FIGURE 1 in that the monitoring SCR 22 is replaced by another three terminal solid state switch which is indicated inside the dotted line box 41. This three terminal solid state switch is a transistor analogue of an SCR. That is, it is a circuit constructed of two transistors 42 and 43 which operates as a solid state switch in essentially the same manner as an SCR. The solid state switch 41 has anode, cathode and gate terminals 23, 24 and 25 respectively. Note that these reference numerals correspond to the anode, cathode and gate terminals of monitoring SCR 22 in the circuit of FIGURE 1. This is done to emphasize the substitution.

The transistors 42 and 43 in the SCR analogue 41 are connected in a fashion known as "inverted" in order to reduce the individual gain of the transistors and make the total circuit operation more stable. That is, the transistor connection usually used as the collector is used in the circuit as the emitter and the normal emitter connection is used as the collector. For this reason and for the purposes of this discussion, the normal emitter and collector terminology as associated with the normal symbol for the transistors is reversed. For example, in PNP transistor terminology the electrode of transistor 42 with the arrow going to the base (electrode 48) would normally be considered the transistor emitter. However, in this description it will be referred to as the collector since it is used as a collector in this particular circuit.

As illustrated, the PNP transistor 42 has its emitter electrode 49 connected directly to the solid state switching means (41) anode terminal 23. The base electrode 50 is connected to the emitter electrode 49 (and hence switch anode terminal 23) through biasing resistor 51. Biasing resistor 51 stabilizes the switch operation.

The NN transistor 43 has its collector electrode 52 connected to the base electrode 50 of PNP transistor 42 through a load resistor 53 so that the NPN transistor 43 drives the base of PNP transistor 42. The collector 54 of NPN transistor 43 is connected to the switch cathode terminal 24 and to its base electrode 55 through biasing resistor 56. Base electrode 55 of NPN transistor 43 is also connected to the collector electrode of PNP transistor 42 through a load resistor 57 so that the collector 48 of PNP transistor 42 drives the base 55 of NPN transistor 43. The base electrode 55 of the NPN transistor 43 is connected directly to the switch gate terminal 25.

Thus, it is seen that when no base drive for NPN transistor 43 is applied at gate terminal 25, NPN transistor 43 does not conduct and no base drive is applied to PNP transistor 42. Thus, the switch 41 is open or nonconductive. When a gate signal is applied at gate terminal 25 and base current is applied to NPN transistor 43 it supplies a base drive for PNP transistor 50 which renders PNP transistor 42 conductive which, in turn, applies base drive to the NPN transistor 43. Under these conditions, the switch 41 is conductive and latched in until anode-cathode voltage is removed (drops to zero) as takes place each half cycle for the alternating current source. Thus, it is seen the switch operates in exactly the same manner as an SCR.

Since the solid state switching means 41 just described operates as an SCR it may be substituted in any of the circuits described here for any of the SCR's so long as the transistors will meet the voltage and current requirements in the circuit. However, since the transistors available have limited current and voltage capability, it is generally not practical to substitute such a switching circuit for SCR's in circuits for large battery or high voltage charging applications.

Figure 8:
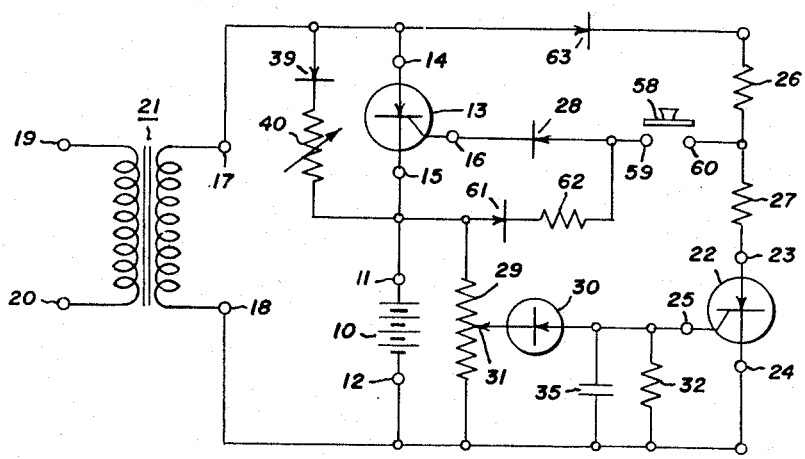

In certain applications, it is desirable to have a means manually to reset the charging operation once it has been interrupted. For example, certain nickel-cadmium batteries exhibit a "hysteresis" effect on cessation of heavy charging. For perhaps 10 minutes after the end of a full charge, the quiescent battery voltage gradually falls by about 100 millivolts per cell. When charged with a circuit such as the one of FIGURE 1, undesirable "hunting" may occur, i.e., the charging circuit shuts off when the battery reaches full charge, the battery voltage starts to fall and the circuit comes on again. This cycle continues to repeat itself and severe damage to the battery may result. In order to overcome this problem, the circuit of FIGURE 8 was developed. This circuit is basically the same as the circuit of FIGURE 1 and for this reason corresponding elements of the two circuits are given identical reference numerals. The principal difference between the two circuits is that after each charging operation the circuit of FIGURE 8 must be reset manually before another charging operation can be performed.

First consider the reset switch 58 in the gate circuit of charging SCR 13 closed on its terminals 59 and 60. For this condition, the circuit paths are exactly as described for the circuit of FIGURE 1 as long as battery 10 is below full charge. This is, for this condition, the charging SCR 13 is supplied with a gate bias through the circuit previously described and fires on each positive half cycle applied between input terminals 17 and 18. The monitoring SCR 22 does not fire as long as the voltage selected on potentiometer 29 by movable tap 31 does not exceed the breakdown voltage of zener diode 30 and the gate firing voltage of the monitoring SCR 22.

Note that as in circuit of FIGURE 1, monitoring SCR 22 fires first when peak charging current is flowing, i.e. $\pi/2$ radians after application of a half cycle of source voltage and with SCR 1 already on. In this circuit, however, monitoring SCR 22 cannot be turned off once it has been fired as it is provided with a continuous D.C. holding current from the battery 10. This current path involves new circuit elements and can be traced from monitoring terminal 11 through rectifier 61, resistor 62, closed reset switch 58, resistor 27, the main current path of monitoring SCR 22 back to the opposite monitoring terminal 12. Since monitoring SCR 22 cannot be turned off (without opening reset switch 58), the reference voltage selected by tap 31 of potentiometer 29 must be selected such that monitoring SCR 22 does not fire until the battery is fully charged. With monitoring SCR 22 on continuously charging SCR 13 cannot be retriggered and thus charging ceases. Consequently, the monitor is now one wherein hunting is eliminated but has the disadvantage that the automatic reset feature of previously described circuits is lost.

In order to reset monitoring SCR 22 and make the circuit ready for another charge cycle, the battery 10 may be removed from the charger or alternatively, the mechanical reset switch 58 may be opened. With this circuit, the use of the trickle charge circuit which includes rectifier 39 and variable resistor 40 is highly desirable in order to compensate for battery drain which would normally take place through the battery lockin network (which includes rectifier 61 and resistor 62 when reset switch 58 is closed).

An additional rectifier 63 is added between anode terminal 14 of charging SCR 13 and resistor 26 to prevent reverse current flow from the battery through rectifier 61, resistor 62, reset switch 58 (when closed), resistor 26 and back to input terminal 17 when monitoring SCR 22 is "off." The rectifier 61 and the lockin circuit is not essential to operation of the device but does help to insure that firing current passing through the reset switch 58 to gate terminal 16 of the main charging SCR 13 is all used for firing and is not dissipated down through the branch of the circuit which includes the blocking rectifier 61.

While particular embodiments of the invention have been shown, it will, of course, be understood that the invention is not limited thereto since many modifications both in the circuit arrangements and the instrumentalities employed may be made. It is contemplated that the appended claims will cover any such modifications as fall within the true spirit and scope of the invention.

What I claim as new and desire to secure by Letters Patent of the United States is:

1. In a voltage level sensitive circuit for monitoring the voltage level of a voltage source, a pair of input terminals for connection to a source of pulsating voltage, first and second series circuit branches connected in parallel with each other and each connected between said pair of input terminals whereby the source of pulsating voltage is applied across each said series circuit branches, first and second solid state switch means each having anode, cathode and gate terminals, said gate terminals provided to determine conduction between anode and cathode terminals of said switch means, said switch means supporting conduction for applied voltage which is positive at anode terminal, relative to cathode terminal and blocking current flow for applied voltage of the opposite polarity, said first series branch including said anode and cathode terminals of said solid state first switch means and resistance means, said second series circuit including said anode and cathode terminals of second switch means and a pair of monitoring terminals for connection to a unidirectional voltage source, a circuit connection between the said gate terminal of said second switch means and said first series circuit branch thereby providing a circuit path between the anode and gate terminals of said second switch means which includes at least a part of the resistance means of said first series circuit branch whereby said second switch means is gate fired by a source voltage pulse, said second switch means being selectively controlled by said first switch means and a voltage comparator circuit connected between said monitoring terminals and between gate and cathode terminals of said first switch means which handles only a reference current whereby said first switch means is rendered conductive upon initiation of a source voltage pulse of proper polarity for conduction when the voltage applied at said monitoring terminals is above a predetermined level so that conduction of said second switch means is prevented when said first switch means conducts before the source voltage pulse has risen far enough to gate fire said second switch means.

2. A voltage level sensitive circuit as defined in claim 1 wherein the said circuit connection between the gate terminal of said second switch and said first series circuit branch includes a rectifier poled to conduct current to said gate terminal and block current flow away from said gate terminal.

3. A voltage level sensitive circuit as defined in claim 1 wherein the said voltage comparator includes resistance means connected between said voltage monitoring terminals, a voltage tap connection connected to said resistance means for selecting a voltage for comparison voltage, a reference voltage means for determining the magnitude of referred voltage, said reference voltage means connected between said voltage tap connection and said gate terminal of said first solid state switch means whereby firing voltage is applied to said gate terminal when said comparison voltage magnitude exceeds the magnitude of the said reference voltage.

4. In a voltage level sensitive circuit as in claim 1, said first and second solid state switch means each being an SCR.

5. A voltage level sensitive circuit for monitoring the voltage level of a voltage source as defined in claim 4 wherein the said voltage comparator includes reference resistance means connected between said voltage monitoring terminals, a voltage tap connection on said reference resistance means for selecting a voltage for comparison voltage, a reference voltage means for determining the magnitude of monitored voltage, said reference voltage means connected between said voltage tap connection and said gate terminal of said first solid state switch means whereby firing voltage is applied to said gate terminal when said comparison voltage magnitude exceeds the magnitude of the said reference voltage.

6. In a voltage level sensitive circuit for monitoring the voltage level of a voltage source, a pair of input terminals for connection to a source of pulsating voltage, first and second series circuit branches connected in parallel with each other and each connected between said pair of input terminals whereby the source of pulsating voltage is applied across each said series circuit branches, first and second solid state switch means each having anode, cathode and gate terminals, said gate terminals provided to determine conduction between anode and cathode terminals of said switch means, said switch means supporting conduction for applied voltage which is positive at anode terminal relative to cathode terminal and blocking current flow for applied voltage of the opposite polarity, said first series branch including said anode and cathode terminals of said solid state first switch means and resistance means, said second series circuit including said anode and cathode terminals of second switch means and a pair of monitoring terminals for connection to a unidirectional voltage source, a circuit connection between the said gate terminal of said second switch means and said first series circuit branch thereby providing a circuit path between the anode and gate terminals of said second switch means which includes at least a part of the resistance means of said first series circuit branch whereby said second switch means is gate fired by a source voltage pulse, holding circuit connection means connecting said anode and cathode terminals of said first switch means between the said pair of monitoring terminals whereby said first switching means remains conductive once fired due to voltage applied at said battery terminals, and a voltage comparator circuit connected between said monitoring terminals and between gate and cathode terminals of said first switch means whereby said first switch means is rendered conductive upon initiation of a source voltage pulse of proper polarity for conduction when the voltage applied at said monitoring terminals is above a predetermined level so that conduction of said second switch means is prevented when said first switch means conducts before the source voltage pulse has risen far enough to gate fire said second switch means.

7. A voltage level sensitive circuit as defined in claim 6 wherein said voltage comparator includes resistance means connected between said voltage monitoring terminals, a voltage tap connected to said resistance means for selecting a voltage for comparison voltage, a reference voltage means for determining the magnitude of referred voltage, said reference voltage means connected between said voltage tap connection and said gate terminal of said first solid state switch means whereby firing voltage is applied to said gate terminal when said comparison voltage magnitude exceeds the magnitude of said reference voltage.

References Cited by the Examiner

UNITED STATES PATENTS

| 3,009,091 | 11/1961 | Hallidy | 322—28 |
| 3,160,805 | 12/1964 | Lawson | 320—39 |
| 3,265,956 | 8/1966 | Schlabach | 323—22 |

OTHER REFERENCES

General Electric SCR Manual, 2nd ed., 1961, pp. 2–3.

JOHN F. COUCH, *Primary Examiner.*

S. WEINBERG, *Assistant Examiner.*